United States Patent
Yamada et al.

(10) Patent No.: US 9,818,999 B2
(45) Date of Patent: Nov. 14, 2017

(54) MULTILAYER POROUS FILM, SEPARATOR FOR NONAQUEOUS ELECTROLYTE SECONDARY BATTERY, AND NONAQUEOUS ELECTROLYTE SECONDARY BATTERY

(71) Applicant: MITSUBISHI CHEMICAL CORPORATION, Chiyoda-ku (JP)

(72) Inventors: Hiroto Yamada, Ogaki (JP); Tomoyuki Nemoto, Nagahama (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 169 days.

(21) Appl. No.: 14/398,585

(22) PCT Filed: Jun. 4, 2013

(86) PCT No.: PCT/JP2013/065453
§ 371 (c)(1),
(2) Date: Nov. 3, 2014

(87) PCT Pub. No.: WO2014/002701
PCT Pub. Date: Jan. 3, 2014

(65) Prior Publication Data
US 2015/0111109 A1    Apr. 23, 2015

(30) Foreign Application Priority Data

Jun. 29, 2012 (JP) ................... 2012-146603

(51) Int. Cl.
*H01M 2/16* (2006.01)
*H01M 2/14* (2006.01)
(Continued)

(52) U.S. Cl.
CPC ........... *H01M 2/1686* (2013.01); *C08J 7/047* (2013.01); *C08K 3/16* (2013.01); *C08K 3/22* (2013.01);
(Continued)

(58) Field of Classification Search
CPC combination set(s) only.
See application file for complete search history.

(56) References Cited

U.S. PATENT DOCUMENTS 7,695,870 B2 * 4/2010 Park ...................... H01M 2/16
                                                   252/511
8,785,032 B2    7/2014 Yamada et al.
(Continued)

FOREIGN PATENT DOCUMENTS

| JP | 2004-227972 A | 8/2004 |
| JP | 2008-186721 A | 8/2008 |

(Continued)

OTHER PUBLICATIONS

International Search Report issued Jul. 2, 2013 in PCT/JP2013/065453 filed Jun. 4, 2013.
(Continued)

*Primary Examiner* — Osei Amponsah
(74) *Attorney, Agent, or Firm* — Oblon, McClelland, Maier & Neustadt, L.L.P.

(57) ABSTRACT

There is provided a multilayer porous film that includes a covering layer formed from a coating liquid on at least one surface of a porous film. The coating liquid has high stability and coatability. The covering layer does not decrease the intrinsic high air permeability of the porous film and has high heat resistance and adhesiveness. The multilayer porous film has excellent handleability as a battery separator without causing curling. The multilayer porous film includes the covering layer on at least one surface of a porous (Continued)

polyolefin resin film. The covering layer is formed from a coating liquid and contains a filler and a resin binder. The multilayer porous film satisfies the following conditions 1) and 2): 1) the filler has an average circularity of 0.3 or more and less than 0.7; and 2) an acid component in the coating liquid has a first acid dissociation constant of 5 or less and has no second acid dissociation constant or a second acid dissociation constant of 7 or more in a dilute aqueous solution at 25° C.

15 Claims, 3 Drawing Sheets

(51) Int. Cl.
| | | |
|---|---|---|
| | *C08K 3/16* | (2006.01) |
| | *C08K 3/22* | (2006.01) |
| | *C08K 5/1535* | (2006.01) |
| | *C09D 129/04* | (2006.01) |
| | *C08J 7/04* | (2006.01) |

(52) U.S. Cl.
CPC .......... *C08K 5/1535* (2013.01); *C09D 129/04* (2013.01); *H01M 2/145* (2013.01); *H01M 2/166* (2013.01); *H01M 2/1653* (2013.01); *C08J 2323/12* (2013.01); *C08J 2429/04* (2013.01); *C08K 2003/2227* (2013.01); *C08K 2201/006* (2013.01); *Y10T 428/249981* (2015.04)

(56) References Cited

U.S. PATENT DOCUMENTS

| | | | | |
|---|---|---|---|---|
| 2009/0246628 A1* | 10/2009 | Adachi | ................... | H01M 4/04 429/209 |
| 2010/0203396 A1 | 8/2010 | Murata | | |
| 2010/0255380 A1* | 10/2010 | Baba | .................... | H01M 2/145 429/246 |
| 2012/0015232 A1* | 1/2012 | Teshima | .............. | H01M 4/1395 429/145 |
| 2013/0323587 A1* | 12/2013 | Kose | .................... | H01M 4/622 429/211 |
| 2014/0193692 A1 | 7/2014 | Yamada et al. | | |

FOREIGN PATENT DOCUMENTS

| | | |
|---|---|---|
| JP | 2008-305783 A | 12/2008 |
| JP | 2010-123465 A | 6/2010 |
| WO | 2008/149986 A1 | 12/2008 |
| WO | 2012/023199 A1 | 2/2012 |
| WO | 2012/042965 A1 | 4/2012 |
| WO | 2013/080867 A1 | 6/2013 |

OTHER PUBLICATIONS

Office Action issued Aug. 4, 2015 in Japanese Patent Application No. 2014-522506 (with English language translation).

* cited by examiner (A)

(B)

MULTILAYER POROUS FILM, SEPARATOR FOR NONAQUEOUS ELECTROLYTE SECONDARY BATTERY, AND NONAQUEOUS ELECTROLYTE SECONDARY BATTERY

CROSS REFERENCE TO RELATED APPLICATION

This application is a 371 of PCT/JP2013/065453, filed on Jun. 4, 2013, and claims priority to Japanese Patent Application No. 2012-146603, filed on Jun. 29, 2012.

FIELD OF INVENTION

The present invention relates to a multilayer porous film and particularly to a multilayer porous film for use in packaging, sanitary, animal husbandry, agricultural, architectural, and medical applications, separator membranes, light diffusing plates, and battery separators, and in particular relates to a multilayer porous film that can be suitably used as a separator for a nonaqueous electrolyte secondary battery. The present invention also relates to a separator for nonaqueous electrolyte secondary battery and a nonaqueous electrolyte secondary battery each manufactured using the multilayer porous film.

BACKGROUND OF INVENTION

Porous polymer bodies having many communicating micropores are used in various fields as separator membranes for use in ultrapure water production, purification of chemical solutions, and water treatment; waterproof moisture-permeable films for use in clothing and sanitary supplies; and battery separators for use in secondary batteries.

Secondary batteries are widely used as power supplies for portable devices, such as OA, FA, household electrical appliances, and communication devices. In particular, portable devices that include lithium-ion secondary batteries are becoming widespread because the lithium-ion secondary batteries have high volumetric efficiency and can reduce the size and weight of the devices. Large secondary batteries are under research and development in many fields related to energy and environmental issues, including load-leveling, UPSs, and electric vehicles. Lithium-ion secondary batteries, which belong to one type of nonaqueous electrolyte secondary batteries, are becoming widespread because of their large capacities, high output power, high voltages, and high long-term storage stability.

The lithium-ion secondary batteries are generally designed to have the highest working voltage in the range of 4.1 to 4.2 V. Aqueous solutions are electrolyzed at such a high voltage and cannot be used as electrolyte solutions. Thus, nonaqueous electrolytes, which contain organic solvents, are used as electrolyte solutions that can withstand high voltages. High-dielectric-constant organic solvents, which can dissolve many lithium ions, are used as solvents for nonaqueous electrolytes. Organic carbonate compounds, such as propylene carbonate and ethylene carbonate, are mainly used as high-dielectric-constant organic solvents. A reactive electrolyte, such as lithium hexafluorophosphate, dissolved in a solvent is used as a supporting electrolyte, which serves as a lithium ion source.

Lithium-ion secondary batteries include a separator between a positive electrode and a negative electrode in order to prevent internal short-circuits. From the nature of the system, the separator must have insulating properties. The separator must have a micropore structure in order to achieve high permeability for passage of lithium ions and to diffuse and retain an electrolyte solution. To satisfy these requirements, porous films are used as separators.

With increasing capacity of batteries, separators are becoming more important for battery safety. The characteristics of battery separators that contribute to greater battery safety include shutdown characteristics (hereinafter referred to as "SD characteristics"). Because of the SD characteristics, micropores of a porous film are closed at a high temperature in the range of approximately 100° C. to 150° C. This can intercept ionic conduction in the battery and thereby prevent a subsequent temperature rise in the battery. The lowest temperature at which micropores of a porous film are closed is referred to as the shutdown temperature (hereinafter referred to as the "SD temperature"). Porous films to be used as battery separators must have the SD characteristics.

However, because of recent increases in energy density and capacity of lithium-ion secondary batteries, there have been accidents in which the shutdown function has not worked well, and the internal temperature of a battery exceeded the melting point (approximately 130° C.) of a polyethylene used as a material of a battery separator. This caused thermal shrinkage and rupture of the separator and a short circuit between the electrodes, resulting in ignition. Thus, in order to ensure battery safety, there is a demand for separators having higher heat resistance than that for the present SD characteristics.

To satisfy the demand, a multilayer porous film is proposed that includes a porous layer on at least one surface of a porous polyolefin resin film (Patent Literatures 1 to 5). The porous layer contains inorganic fine particles, for example, of a metal oxide and a resin binder. In these multilayer porous films, a coated layer filled with a large number of inorganic fine particles, for example, of α-alumina is formed on a porous film. In the case of abnormal heat generation and a temperature rise above the SD temperature, the coated layer can prevent a short circuit between the electrodes and significantly improve battery safety.

In particular, in Patent Literature 4, the inorganic fine particles are plate-like particles in order to prevent internal short-circuits and to ensure battery safety. In Patent Literature 5, filler particles having a circularity distribution closer to a perfect circle are used to maintain the porosity of the porous layer.

LIST OF LITERATURE

Patent Literature

Patent Literature 1: Japanese Patent Publication 2004-227972 A
Patent Literature 2: Japanese Patent Publication 2008-186721 A
Patent Literature 3: WO 2008/149986
Patent Literature 4: Japanese Patent Publication 2008-305783 A
Patent Literature 5: WO 2012/023199

OBJECT AND SUMMARY OF INVENTION

Object of Invention

However, in the methods described in Patent Literatures 1 to 5, a much larger amount of inorganic fine particles than the amount of resin binder is generally used. In this situation, common particles having low circularity, particularly plate-like particles as described in Patent Literature 4, are likely to reaggregate, resulting in poor stability or coatability of the coating liquid. Thus, it is difficult to form a uniform film.

On the other hand, inorganic fine particles having high circularity as described in Patent Literature 5 can be used to form a heat-resistant layer having excellent appearance and uniformity. However, because of their isotropic heights, particles are densely packed, and it is difficult to relieve strain caused by the thermal shrinkage of the heat-resistant layer in a coating and drying process. This often results in curling. Use of a significantly curled porous film as a separator causes problems of poor handleability and a low yield in a battery manufacturing process.

An object of the present invention is to solve these problems. It is an object of the present invention to provide a multilayer porous film that includes a covering layer formed from a coating liquid on at least one surface of a porous film. The coating liquid has high stability and coatability. The covering layer does not decrease the intrinsic high air permeability of the porous film and has high heat resistance and adhesiveness. The multilayer porous film has excellent handleability as a battery separator without causing curling.

SUMMARY OF INVENTION

A multilayer porous film according to the present invention includes a covering layer on at least one surface of a porous polyolefin resin film. The covering layer is formed from a coating liquid and contains a filler and a resin binder. The multilayer porous film satisfies the following conditions 1) and 2):

1) the filler has an average circularity of 0.3 or more and less than 0.7; and 2) the coating liquid contains an acid component, and the acid component has a first acid dissociation constant ($pK_{a1}$) of 5 or less and has no second acid dissociation constant ($pK_{a2}$) or a second acid dissociation constant ($pK_{a2}$) of 7 or more in a dilute aqueous solution at 25° C.

In the present invention, the acid component content of the coating liquid is preferably 10 mass ppm or more and 10000 mass ppm or less.

In the present invention, the filler is preferably made of a metal oxide.

In the present invention, the filler preferably has a specific surface area of 5 $m^2/g$ or more and less than 15 $m^2/g$.

In the present invention, the filler content of the covering layer is preferably 80% by mass or more and 99.9% by mass or less of the total amount of the filler and the resin binder.

In the present invention, the porous polyolefin resin film preferably contains polypropylene.

In the present invention, the porous polyolefin resin film preferably has β crystal activity.

In the present invention, the covering layer is preferably formed on the porous polyolefin resin film using a coating and drying method.

In the present invention, the coating liquid preferably contains a solvent mainly composed of water.

A separator for a nonaqueous electrolyte secondary battery according to the present invention is manufactured using a multilayer porous film according to the present invention.

A nonaqueous electrolyte secondary battery according to the present invention is manufactured using the separator for a nonaqueous electrolyte secondary battery according to the present invention.

Advantageous Effects of Invention

In accordance with the present invention, a covering layer having high heat resistance and adhesiveness can be formed on a porous polyolefin resin film from a coating liquid having high stability and coatability without decreasing the intrinsic high air permeability of the porous polyolefin resin film. The present invention can also provide a multilayer porous film having excellent handleability as a nonaqueous electrolyte secondary battery separator with little curling.

DESCRIPTION OF EMBODIMENTS

Figure 1:
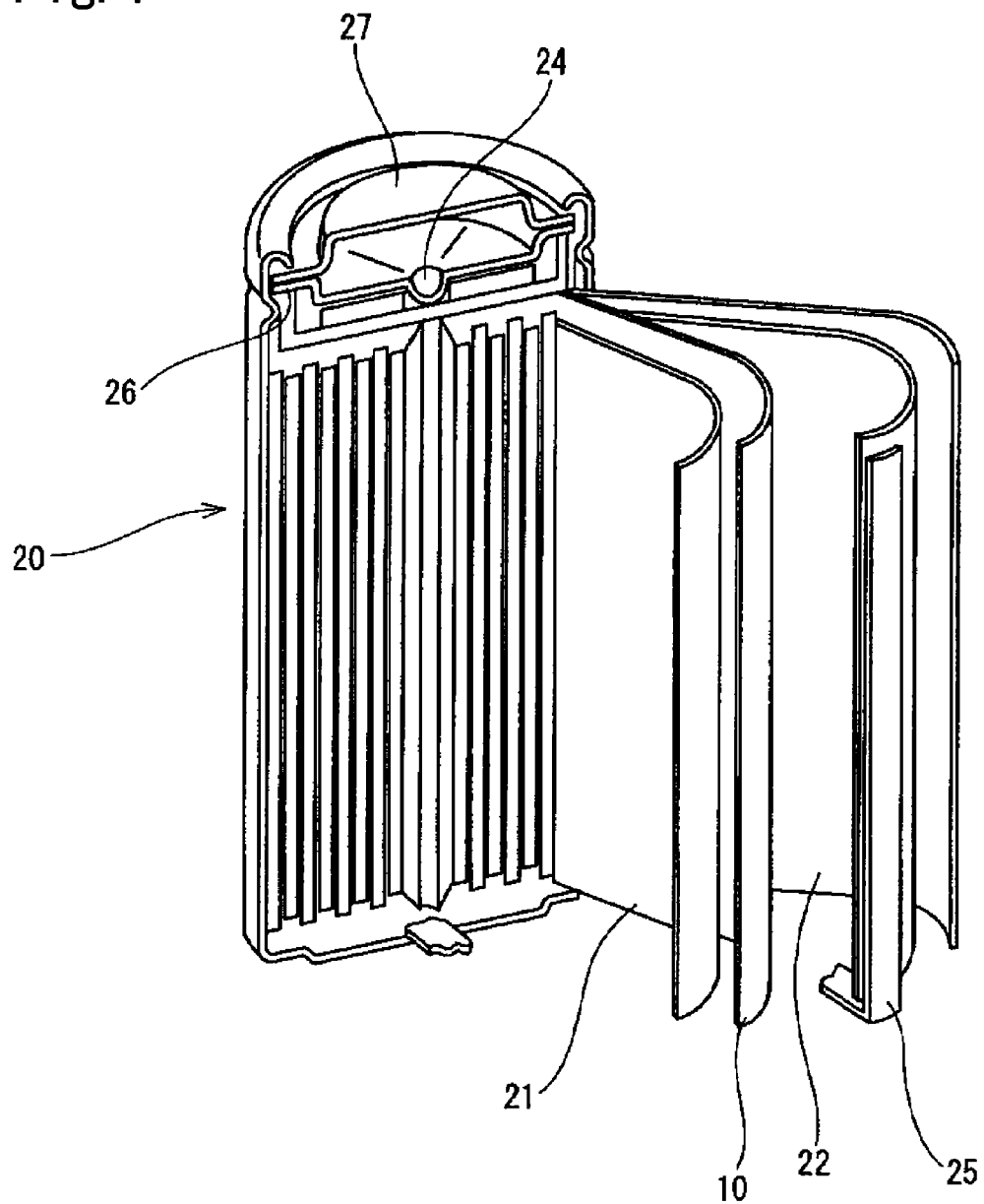
FIG. 1 is a schematic cross-sectional view of a battery that includes a multilayer porous film according to the present invention.

Embodiments of a multilayer porous film, a nonaqueous electrolyte secondary battery separator, and a nonaqueous electrolyte secondary battery according to the present invention will be described in detail below.

Unless otherwise specified, the term "main component", as used herein, allows inclusion of another component without impairing the function of the main component. Although the main component content is not particularly limited, the main component content of the composition may be 50% by mass or more, preferably 70% by mass or more, particularly preferably 90% by mass or more (including 100%).

Unless otherwise specified, the term "X to Y" (X and Y are arbitrary numbers), as used herein, refers to "preferably more than X" and "preferably less than Y", as well as "X or more and Y or less".

[Multilayer Porous Film]

The components of a multilayer porous film according to the present invention will be described below.

<Porous Polyolefin Resin Film>

Examples of the polyolefin resin for use in the porous polyolefin resin film include homopolymers and copolymers of α-olefins, such as ethylene, propylene, 1-butene, 4-methyl-1-pentene, and 1-hexene. Two or more of these homopolymers or copolymers may be mixed. Among these, a polypropylene resin or a polyethylene resin is preferably used. In particular, a polypropylene resin is preferably used to maintain the mechanical strength and heat resistance of a multilayer porous film according to the present invention.

Polypropylene Resin

Examples of the polypropylene resin for use in the present invention include homopolypropylene (propylene homopolymer) and random copolymers and block copolymers of propylene and α-olefins, such as ethylene, 1-butene, 1-pentene, 1-hexene, 1-heptene, 1-octene, 1-nonene, and 1-decene. Among these, homopolypropylene is suitably used to maintain the mechanical strength and heat resistance of a multilayer porous film according to the present invention.

A polypropylene resin to be used preferably has an isotactic pentad content (mmmm content) in the range of 80% to 99%, more preferably 83% to 98%, still more preferably 85% to 97%. The isotactic pentad content represents stereoregularity. An excessively low isotactic pentad content may result in a film having low mechanical strength. Although the upper limit of the isotactic pentad content is defined by the present industrial upper limit, this shall not apply to resins having higher regularity possibly developed at the industrial level in the future.

The isotactic pentad content (mmmm content) is a three-dimensional structure in which five methyl groups on the side chains are arranged in the same direction along the main chain having carbon-carbon bonds composed of five consecutive propylene units, or the percentage thereof. Signals in the methyl group region are assigned according to A. Zambelli et al. (Macromolecules 8, 687, (1975)).

A polypropylene resin to be used preferably has Mw/Mn in the range of 2.0 to 10.0, more preferably 2.0 to 8.0, still more preferably 2.0 to 6.0. Mw/Mn is a parameter that indicates the molecular weight distribution. A smaller Mw/Mn means a narrower molecular weight distribution. A Mw/Mn of less than 2.0 may result in poor extrusion formability and make industrial production difficult. A Mw/Mn of more than 10.0 results in an increased amount of low-molecular-weight component and tends to result in a multilayer porous film having low mechanical strength. Mw/Mn can be determined using a gel permeation chromatography (GPC) method.

Such a polypropylene resin may have any melt flow rate (MFR) and preferably has a MFR in the range of 0.5 to 15 g/10 min, more preferably 1.0 to 10 g/10 min. A polypropylene resin having a MFR of 0.5 g/10 min or more can have high melt viscosity in shape processing, thus ensuring high productivity. A MFR of 15 g/10 min or less results in a multilayer porous film having sufficient mechanical strength. The MFR of polypropylene resins is measured at a temperature of 230° C. and at a load of 2.16 kg in accordance with JIS K 7210.

Such a polypropylene resin may be produced using any method, including a known polymerization method using a known olefin polymerization catalyst, for example, a slurry polymerization method, a melt polymerization method, a bulk polymerization method, or a gas-phase polymerization method using a multisite catalyst exemplified by a Ziegler-Natta catalyst or a single-site catalyst exemplified by a metallocene catalyst, or a bulk polymerization method using a radical initiator.

Examples of such a polypropylene resin include commercially available products, such as trade names "Novatec PP" and "WINTEC" (manufactured by Japan Polypropylene Corporation), "Notio" and "Tafmer XR" (manufactured by Mitsui Chemicals, Inc.), "Zelas" and "Thermorun" (manufactured by Mitsubishi Chemical Corp.), "Sumitomo Noblen" and "Tafthren" (manufactured by Sumitomo Chemical Co., Ltd.), "Prime Polypro" and "Prime TPO" (manufactured by Prime Polymer Co., Ltd.), "Adflex", "Adsyl", and "HMS-PP (PF814)" (manufactured by SunAllomer Ltd.), and "Versify" and "Inspire" (manufactured by The Dow Chemical Company).

Polyethylene Resin

Examples of polyethylene resins for use in the present invention include low-density polyethylenes, linear low-density polyethylenes, linear very-low-density polyethylenes, medium-density polyethylenes, high-density polyethylenes, and ethylene copolymers mainly composed of ethylene, more specifically, ethylene and an α-olefin having 3 to 10 carbon atoms, such as propylene, butene-1, pentene-1, hexene-1, heptene-1, or octene-1; vinyl esters, such as vinyl acetate and vinyl propionate; and copolymers and multicomponent copolymers of one or two or more comonomers selected from unsaturated compounds, for example, unsaturated carboxylate esters, such as methyl acrylate, ethyl acrylate, methyl methacrylate, and ethyl methacrylate, conjugated dienes, and nonconjugated dienes, and mixed compositions of the copolymers and multicomponent copolymers. Ethylene copolymers generally have an ethylene unit content of more than 50% by mass.

Among these polyethylene resins, at least one polyethylene resin selected from low-density polyethylenes, linear low-density polyethylenes, and high-density polyethylenes is preferred, and high-density polyethylenes are more preferred.

The polyethylene resins preferably have a density in the range of 0.910 to 0.970 g/cm$^3$, more preferably 0.930 to 0.970 g/cm$^3$, still more preferably 0.940 to 0.970 g/cm$^3$. A density of 0.910 g/cm$^3$ or more is preferred because this results in suitable SD characteristics. A density of 0.970 g/cm$^3$ or less is preferred because this results in suitable SD characteristics and stretchability.

The density of a polyethylene resin can be measured in accordance with JIS K 7112 using a density-gradient tube method.

The polyethylene resins may have any melt flow rate (MFR) and preferably have a MFR in the range of 0.03 to 30 g/10 min, more preferably 0.3 to 10 g/10 min. Polyethylene resins having a MFR of 0.03 g/10 min or more are preferred because the polyethylene resins have sufficiently low melt viscosity and improved productivity in shape processing. Polyethylene resins having a MFR of 30 g/10 min or less are preferred because this results in sufficient mechanical strength.

The MFR of polyethylene resins is measured at a temperature of 190° C. and at a load of 2.16 kg in accordance with JIS K 7210.

Such polyethylene resins may be produced using any method, including a known polymerization method using a known olefin polymerization catalyst, for example, a polymerization method using a multisite catalyst exemplified by a Ziegler-Matta catalyst or a single-site catalyst exemplified by a metallocene catalyst. Polyethylene resins may be produced by one-step polymerization, two-step polymerization, or multistage polymerization. Any of polyethylene resins thus produced may be used.

β Crystal Activity

In a multilayer porous film according to the present invention, the porous polyolefin resin film preferably has β crystal activity. β crystal activity can be considered to be an indicator of the formation of β crystals in a film-like substance before stretching. Formation of β crystals in a film-like substance before stretching facilitates formation of micropores by stretching without using an additive agent, such as filler, thereby forming a multilayer porous film having air-permeability characteristics.

In the case where a layer containing a polypropylene resin is stacked in addition to a layer formed of a polypropylene resin, both of the layers preferably have β crystal activity.

In a multilayer porous film according to the present invention, detection of a crystal melting peak temperature resulting from β crystals using a differential scanning calorimeter described below and/or detection of a diffraction peak resulting from β crystals using an X-ray diffractometer described below indicates the presence of "β crystal activity".

β crystal activity can be determined throughout all the layers of a multilayer porous film according to the present invention.

Determination of the presence or absence of β crystal activity will be more specifically described below for a porous polyolefin resin film that contains one of the polypropylene resins as a polyolefin resin.

(1) In the Case of Differential Scanning Calorimeter

In this case, the presence of β crystal activity is indicated by the detection of a crystal melting peak temperature (Tmβ) resulting from β crystals of a polypropylene resin using a differential scanning calorimeter after a multilayer porous film is heated from 25° C. to 240° C. at a heating rate of 10° C./min, is maintained at 240° C. for 1 minute, is then cooled from 240° C. to 25° C. at a cooling rate of 10° C./min, is maintained at 25° C. for 1 minute, and is then reheated from 25° C. to 240° C. at a heating rate of 10° C./min.

The degree of β crystal activity of the multilayer porous film is calculated using the following formula from the heat of crystal melting resulting from α crystals ($\Delta Hm\alpha$) and the heat of crystal melting resulting from β crystals ($\Delta Hm\beta$) of the polypropylene resin.

$$\text{Degree of β crystal activity (\%)} = [\Delta Hm\beta/(\Delta Hm\beta + \Delta Hm\alpha)] \times 100$$

For example, in the case where the polypropylene resin is a homopolypropylene, the degree of β crystal activity of the multilayer porous film can be calculated from the heat of crystal melting resulting from β crystals ($\Delta Hm\beta$) principally measured at a temperature of 145° C. or more and less than 160° C. and the heat of crystal melting resulting from α crystals ($\Delta Hm\alpha$) principally measured at a temperature of 160° C. or more and 170° C. or less. For example, in the case where the polypropylene resin is a random polypropylene copolymerized with 1% to 4% by mole ethylene, the degree of β crystal activity of the multilayer porous film can be calculated from the heat of crystal melting resulting from β crystals ($\Delta Hm\beta$) principally measured at a temperature of 120° C. or more and less than 140° C. and the heat of crystal melting resulting from α crystals ($\Delta Hm\alpha$) principally measured at a temperature of 140° C. or more and 165° C. or less.

The porous polyolefin resin film preferably has a high degree of β crystal activity, preferably 20% or more, more preferably 40% or more, particularly preferably 60% or more. When the degree of β crystal activity of a porous polyolefin resin film is 20% or more, β crystals of a polypropylene resin can be formed in large quantity in a film-like substance before stretching, and many uniform micropores are formed by stretching. Thus, the resulting battery separator can have high mechanical strength and air permeability.

Although the degree of β crystal activity has no particularly upper limit, the effects described above can be more effectively produced at a higher degree of β crystal activity. Thus, the degree of β crystal activity is preferably closer to 100%.

(2) In the Case of X-Ray Diffractometer

The presence or absence of β crystal activity is judged from the diffraction profile obtained from the wide-angle X-ray diffraction measurement of a multilayer porous film subjected to particular heat treatment. More specifically, a multilayer porous film is subjected to heat treatment at a temperature in the range of 170° C. to 190° C., which range is higher than the melting points of polypropylene resins, and is then slowly cooled to form and grow β crystals. The multilayer porous film is then subjected to wide-angle X-ray measurement. The presence of β crystal activity is indicated by the detection of a diffraction peak resulting from a (300) face of β crystals of the polypropylene resin at 2θ in the range of 16.0 to 16.5 degrees.

The β crystal structure and wide-angle X-ray diffraction of polypropylene resins are described in detail in Macromol. Chem. 187, 643-652 (1986), Prog. Polym. Sci. Vol. 16, 361-404 (1991), Macromol. Symp. 89, 499-511 (1995), and Macromol. Chem. 75, 134 (1964), and references cited therein. A method for evaluating β crystal activity by wide-angle X-ray diffraction is described in detail below in the examples.

A method for producing β crystal activity may be a method using no substance for promoting the formation of α crystals of a polypropylene resin, a method using a polypropylene resin subjected to treatment for producing peroxide radicals as described in Japanese Patent No. 3739481, or a method including addition of a β crystal nucleating agent to a composition.

β Crystal Nucleating Agent

β crystal nucleating agents for use in the present invention are described below and may be any β crystal nucleating agents that can promote the formation and growth of β crystals of a polypropylene resin. These β crystal nucleating agents may be used alone or in combination.

Examples of the β crystal nucleating agents include amide compounds; tetraoxaspiro compounds; quinacridones; nanoscale iron oxides; carboxylic acid alkali and alkaline-earth metal salts exemplified by potassium 1,2-hydroxystearate, magnesium benzoate, magnesium succinate, and magnesium phthalate; aromatic sulfonic acid compounds exemplified by sodium benzenesulfonate and sodium naphthalenesulfonate; di- and tri-esters of di- and tri-basic carboxylic acids; phthalocyanine pigments exemplified by phthalocyanine blue; two-component system compounds composed of an organic dibasic acid component A and an oxide, hydroxide, or salt component B of the group 2 metals of the periodic table; and compositions composed of cyclic phosphorus compounds and magnesium compounds. Specific types of nucleating agents are described in Japanese Unexamined Patent Application Publications Nos. 2003-306585, 08-144122, and 09-194650.

A commercially available β crystal nucleating agent may be a β crystal nucleating agent "Njstar NU-100" manufactured by New Japan Chemical Co., Ltd. Specific examples of polypropylene resins to which a β crystal nucleating agent is added include a polypropylene "Bepol B-022SP" manufactured by Aristech, a polypropylene "Beta(β)-PP BE60-7032" manufactured by Borealis, and a polypropylene "BNX BETAPP-LN" manufactured by Mayzo.

The amount of β crystal nucleating agent to be added to the polyolefin resin depends on the type of β crystal nucleating agent or the composition of the polyolefin resin and preferably ranges from 0.0001 to 5 parts by mass, more preferably 0.001 to 3 parts by mass, still more preferably 0.01 to 1 part by mass, per 100 parts by mass of the polyolefin resin of the porous polyolefin resin film. When the amount of β crystal nucleating agent to be added to the polyolefin resin is 0.0001 parts by mass or more, β crystals of the polyolefin resin can be sufficiently formed and grown during production. A separator manufactured using the polyolefin resin can have sufficient β crystal activity and desired air permeability. The addition of 5 parts by mass or less of a β crystal nucleating agent is economically advantageous and causes no bleeding of the β crystal nucleating agent on a surface of the porous polyolefin resin film.

Other Components

In the present invention, in addition to the components described above, additive agents generally added to resin compositions can be appropriately added to a porous polyolefin resin film without losing the advantages of the present invention. Examples of such additive agents include those added to improve and adjust molding processability, productivity, and the physical properties of porous polyolefin resin films, for example, recycled resins from trimming losses, such as borders, inorganic particles, such as silica, talc, kaolin, and calcium carbonate, pigments, such as carbon black, flame retardants, weathering stabilizers, heat stabilizers, antistatic agents, melt viscosity improvers, crosslinkers, lubricants, nucleating agents, plasticizers, age resisters, antioxidants, light stabilizers, ultraviolet absorbers, neutralizing agents, anti-fogging agents, anti-blocking agents, slip agents, and colorants.

In order to promote the opening of pores or improve molding processability, a modified polyolefin resin, a saturated aliphatic hydrocarbon resin or a modified product thereof, an ethylene polymer, a wax, or a low-molecular-weight polypropylene may be added without losing the advantages of the present invention.

Layer Structure of Porous Polyolefin Resin Film

In the present invention, a porous polyolefin resin film may be monolayer or multilayer and is not particularly limited. Particularly preferred is a monolayer film composed of a layer containing the polyolefin resin (hereinafter also referred to as an "A layer") or a multilayer film composed of the A layer and another layer (hereinafter also referred to as a "B layer"), provided that the B layer does not impair the function of the A layer. For example, in the case where a porous polyolefin resin film is used as a nonaqueous electrolyte secondary battery separator, a low-melting-point resin layer that can close pores in a high-temperature atmosphere and thereby ensure battery safety as described in Japanese Unexamined Patent Application Publication No. 04-181651 can be stacked on the porous polyolefin resin film.

Specific examples include a two-layer structure of A layer/B layer and three-layer structures of A layer/B layer/A layer and B layer/A layer/B layer. The A layer and the B layer may be combined with a layer having another function to form a structure composed of three different layers. In this case, the layer having another function may be disposed at any position. The number of layers may be increased to four, five, six, or seven, if necessary.

The physical properties of a porous polyolefin resin film for use in the present invention can be freely adjusted by changing the layer structure, stacking ratio, layer composition, and manufacturing method.

Method for Manufacturing Porous Polyolefin Resin Film

A method for manufacturing a porous polyolefin resin film for use in the present invention will be described below. However, a porous polyolefin resin film for use in the present invention is not limited to a porous polyolefin resin film manufactured by such a manufacturing method.

More specifically, a nonporous film-like substance is produced by melt extrusion using the polyolefin resin. The nonporous film-like substance is stretched to form a porous film having many communicating micropores in the thickness direction.

The nonporous film-like substance may be produced using any method, including a known method. For example, a thermoplastic resin composition is melted in an extruder, is extruded through a T-die, and is cooled and solidified with a casting roll. A film-like substance manufactured using a tubular method may be cut open to form a planar substance.

Pores in a nonporous film-like substance may be formed by any method, including a known method, for example, by uniaxial or multi-axial stretching in a wet process or by uniaxial or multi-axial stretching in a dry process. The stretching method may be a roll stretching method, a rolling method, a tenter stretching method, or a simultaneous biaxial stretching method. These methods may be used alone or in combination to perform uniaxial stretching or biaxial stretching. Among these, sequential biaxial stretching is preferred in terms of porous structure control. If necessary, a polyolefin resin composition may be dried before and/or after stretching by extracting a plasticizer contained in the polyolefin resin composition using a solvent.

In the present invention, methods for manufacturing a porous polyolefin resin film having a multilayer structure are broadly divided into the following four categories depending on the order of the pore formation and stacking.

(i) A method for forming pores in each layer and then stacking the porous layers by lamination or using an adhesive.

(ii) A method for stacking layers to produce a multilayer nonporous film-like substance and then forming pores in the multilayer nonporous film-like substance.

(iii) A method for forming pores by forming pores in one of layers and stacking the porous layer on another layer formed of a nonporous film-like substance.

(iv) A method for forming a multilayer porous film by forming a porous layer and then performing coating application of inorganic or organic particles or vapor deposition of metal particles.

In the present invention, the method (ii) is preferred because of its simplicity and productivity. In particular, in order to improve interlayer adhesion between two layers, particularly preferred is a method for producing a multilayer nonporous film-like substance by coextrusion and forming pores in the multilayer nonporous film-like substance.

A method for manufacturing a porous polyolefin resin film will be described in detail below.

First, a mixed resin composition is produced from a polyolefin resin, an optional thermoplastic resin, and an optional additive agent. For example, raw materials, such as a polypropylene resin, a β crystal nucleating agent, and an optional additive, are preferably mixed in a Henschel mixer, super mixer, or tumbler mixer, or are mixed in a bag by hand. The mixture is then melt-kneaded in a single- or twin-screw extruder or a kneader, preferably a twin-screw extruder, and is cut into pellets.

The pellets are fed into an extruder and are extruded through a T-die extrusion nozzle to form a film-like substance. Any type of T-die may be used. For example, when a porous polyolefin resin film for use in the present invention has a three-layer structure composed of two types of layers, the T-die may be of a multi-manifold type for a three-layer structure composed of two types of layers or of a feed-block type for a three-layer structure composed of two types of layers.

The clearance of the T-die depends on the final required film thickness, stretching conditions, draft ratio, and other conditions and generally ranges from approximately 0.1 to 3.0 mm, preferably 0.5 to 1.0 mm. A T-die clearance of 0.1 mm or more is preferred in terms of production rate. A T-die clearance of 3.0 mm or less is preferred in terms of production stability because the draft ratio is not excessively increased.

In the extrusion, the extrusion temperature depends on the rheological characteristics and formability of the resin composition and preferably ranges from approximately 180° C. to 350° C., more preferably 200° C. to 330° C., still more preferably 220° C. to 300° C. An extrusion temperature of 180° C. or more is preferred because of sufficiently low viscosity of the molten resin, excellent formability, and improved productivity. An extrusion temperature of 350° C. or less results in slower deterioration of the resin composition and consequently a smaller decrease in mechanical strength of the resulting multilayer porous film.

The cooling and solidification temperature in the case of a casting roll is very important in the present invention. This temperature can be controlled to adjust the percentage of β crystals in a polyolefin resin in a film-like substance. The cooling and solidification temperature in the case of a casting roll preferably ranges from 80° C. to 150° C., more preferably 90° C. to 140° C., still more preferably 100° C. to 130° C. A cooling and solidification temperature of 80° C. or more is preferred because the percentage of β crystals in a film-like substance can be sufficiently increased. A cooling and solidification temperature of 150° C. or less is preferred because this can avoid troubles, such as adhesion and winding of extruded molten resin around the casting roll, and a film-like substance can be efficiently produced.

The percentage of β crystals in a polyolefin resin of a film-like substance before stretching is preferably adjusted in the range of 30% to 100% by setting the temperature range of the casting roll as described above. The percentage of β crystals in a polyolefin resin of a film-like substance before stretching more preferably ranges from 40% to 100%, still more preferably 50% to 100%, most preferably 60% to 100%. When the percentage of β crystals in a film-like substance before stretching is 30% or more, this facilitates pore formation in subsequent stretching, and the resulting porous polyolefin resin film can have good air-permeability characteristics.

The percentage of β crystals in a film-like substance before stretching is calculated using the following formula from the heat of crystal melting resulting from α crystals (ΔHmα) and the heat of crystal melting resulting from β crystals (ΔHmβ) of a polyolefin resin measured with a differential scanning calorimeter when the film-like substance is heated from 25° C. to 240° C. at a heating rate of 10° C./min.

Percentage of β crystals (%)=[ΔHmβ/(ΔHmβ+ΔHmα)]×100

The resulting nonporous film-like substance is then stretched. Although the stretching process may be uniaxial stretching, at least biaxial stretching is more preferred. Although the biaxial stretching may be simultaneous biaxial stretching or sequential biaxial stretching, sequential biaxial stretching is more preferred because the stretching conditions (stretching ratio, temperature) in each stretching process can be easily determined, and the porous structure can be easily controlled. The lengthwise direction of a film-like substance or a film is referred to as "longitudinal", and the direction perpendicular to the lengthwise direction is referred to as "transverse". Stretching in the lengthwise direction is referred to as "longitudinal stretching", and stretching in the direction perpendicular to the lengthwise direction is referred to as "transverse stretching".

The lengthwise direction is generally the extrusion direction in the extrusion of a film-like substance.

In the case of sequential biaxial stretching, the stretching temperature depends on the resin composition, the crystal melting peak temperature, and the degree of crystallinity. The stretching temperature in longitudinal stretching preferably ranges from approximately 0° C. to 130° C., more preferably 10° C. to 120° C., still more preferably 20° C. to 110° C. The stretching ratio in longitudinal stretching preferably ranges from 2 to 10, more preferably 3 to 8, still more preferably 4 to 7. Longitudinal stretching in these ranges can decrease the likelihood of rupture during stretching and appropriately form the starting points of pores.

The stretching temperature in transverse stretching ranges from approximately 100° C. to 160° C., preferably 110° C. to 150° C., more preferably 120° C. to 140° C. The stretching ratio in transverse stretching preferably ranges from 1.2 to 10, more preferably 1.5 to 8, still more preferably 2 to 7. Transverse stretching in these ranges can appropriately enlarge the starting points of β ores formed in the longitudinal stretching and thereby form a microporous structure.

The stretching rate in the stretching process preferably ranges from 500% to 12000%/min, more preferably 1500% to 10000%/min, still more preferably 2500% to 8000%/min.

The porous polyolefin resin film thus formed is preferably subjected to heat treatment in order to improve dimensional stability. The dimensional stability is expected to be improved when the heat-treatment temperature is preferably 100° C. or more, more preferably 120° C. or more, still more preferably 140° C. or more. The heat-treatment temperature is preferably 170° C. or less, more preferably 165° C. or less, still more preferably 160° C. or less. A heat-treatment temperature of 170° C. or less is preferred because a polyolefin resin rarely melts in the heat treatment and can maintain its porous structure. During the heat-treatment process, 1% to 20% relaxation treatment may be performed if necessary.

After the heat treatment, a porous polyolefin resin film is formed by uniform cooling and coiling.

The thickness of the porous polyolefin resin film is appropriately determined so as to achieve the suitable thickness of a multilayer porous film according to the present invention while ensuring the suitable thickness of a covering layer according to the present invention described below.

<Covering Layer>

A multilayer porous film according to the present invention includes a covering layer containing a filler and a resin binder on at least one surface of a porous polyolefin resin film. In the present invention, the covering layer is formed from a coating liquid.

Filler

Examples of fillers for use in the present invention include, but are not limited to, inorganic fillers and organic fillers.

More specifically, examples of inorganic fillers for use in the present invention include metal carbonates, such as calcium carbonate, magnesium carbonate, and barium carbonate, metal sulfates, such as calcium sulfate, barium sulfate, and magnesium sulfate, metal oxides, such as calcium oxide, magnesium oxide, zinc oxide, alumina, silica, and titanium oxide, metal chlorides, such as sodium chloride, magnesium chloride, silver chloride, and calcium chloride, and clay minerals, such as talc, clay, mica, and montmorillonite. Among these, metal oxides are preferred, and alumina is particularly preferred, because these are chemically inert in batteries when used in battery separators.

Examples of organic fillers for use in the present invention include fillers formed of thermoplastic resins and thermosetting resins, such as ultra-high molecular weight polyethylene, polystyrene, poly(methyl methacrylate), polycarbonate, poly(ethylene terephthalate), poly(butylene terephthalate), poly(phenylene sulfide), polysulfone, polyethersulfone, poly(ether ether ketone), polytetrafluoroethylene, polyimide, polyetherimide, melamine, and benzoguanamine. Among these, cross-linked polystyrene is preferred in terms of resistance to swelling by electrolyte solution when a multilayer porous film according to the present invention is used as a nonaqueous electrolyte secondary battery separator.

In the present invention, it is important that the filler has an average circularity of 0.3 or more and less than 0.7. The lower limit of the average circularity of the filler is preferably 0.35 or more, more preferably 0.4 or more. The upper limit of the average circularity of the filler is preferably 0.65 or less, more preferably 0.6 or less.

The filler preferably has an average circularity of 0.3 or more because the adsorbed water content resulting from an excessive increase in specific surface area of the filler can be suppressed. The circularity is preferably less than 0.7 because filler particles are not excessively densely packed in the covering layer, and therefore strain caused by thermal shrinkage of the covering layer in a coating and drying process can be relieved. This can decrease the likelihood of curling of a multilayer porous film according to the present invention.

The term "average circularity of filler", as used herein, refers to the average of the ratios L'/L in the longitudinal and transverse directions, wherein L denotes the actual perimeter of a two-dimensional projection image of the filler in the longitudinal or transverse direction, and L' denotes the perimeter of a perfect circle having the same area as the projection image. L and L' are measured with an image analyzing apparatus, for example.

The lower limit of the average particle size of the filler is preferably 0.01 μm or more, more preferably 0.1 μm or more, still more preferably 0.2 μm or more. The upper limit of the average particle size of the filler is preferably 3.0 μm or less, more preferably 1.5 μm or less. The average particle size is preferably 0.01 μm or more because a multilayer porous film according to the present invention can have sufficient heat resistance. The average particle size is preferably 3.0 μm or less because the dispersion of the filler in the covering layer is improved.

The term "average particle size of filler" in the present embodiments is calculated by averaging the mean lengths of the minor axis length and the major axis length of a two-dimensional projection image of the filler in the longitudinal and transverse directions, for example, measured with an image analyzing apparatus.

The specific surface area per unit weight of the filler is preferably 5 m²/g or more and less than 15 m²/g. The specific surface area of the filler is preferably 5 m²/g or more because this results in a high permeation speed of an electrolyte solution through a multilayer porous film according to the present invention used as a separator in a nonaqueous electrolyte secondary battery and high productivity. The specific surface area of the filler is preferably less than 15 m²/g because this can reduce the adsorption of an electrolyte solution component on a multilayer porous film according to the present invention used as a separator in a nonaqueous electrolyte secondary battery.

The term "specific surface area per unit weight of filler" in the present embodiments refers to the value measured using a constant-volume gas adsorption method.

Resin Binder

A resin binder for use in the present invention may be any resin binder that can satisfactorily combine the filler with the porous polyolefin resin film, is electrochemically stable, and is stable in an organic electrolyte solution when the multilayer porous film is used as a nonaqueous electrolyte secondary battery separator. Specific examples include polyether, polyamide, polyimide, polyamideimide, polyaramide, ethylene-vinyl acetate copolymers (the structural unit derived from vinyl acetate constitutes 0% to 20% by mole), ethylene-acrylic acid copolymers, such as ethylene-ethyl acrylate copolymers, poly(vinylidene fluoride), poly(vinylidene fluoride)-hexafluoropropylene, poly(vinylidene fluoride)-trichloroethylene, polytetrafluoroethylene, fluorinated rubber, styrene-butadiene rubber, nitrile butadiene rubber, polybutadiene rubber, polyacrylonitrile, poly(acrylic acid) and derivatives thereof, poly(methacrylic acid) and derivatives thereof, carboxymethylcellulose, hydroxyethylcellulose, cyanoethylcellulose, poly(vinyl alcohol), cyanoethyl poly(vinyl alcohol), poly(vinyl butyral), polyvinylpyrrolidone, poly-N-vinylacetamide, cross-linked acrylic resin, polyurethane, epoxy resin, and maleic-acid-modified polyolefin. These resin binders may be used alone or in combination. Among these resin binders, polyoxyethylene, poly(vinyl alcohol), poly(vinylidene fluoride), polyvinylpyrrolidone, polyacrylonitrile, styrene-butadiene rubber, carboxymethylcellulose, poly(acrylic acid) and derivatives thereof, and maleic-acid-modified polyolefin are preferred because these are relatively stable even in water.

The filler content of the covering layer is preferably 80% by mass or more and 99.9% by mass or less of the total amount of the filler and the resin binder. The filler content is more preferably 92% by mass or more, still more preferably 95% by mass or more, particularly preferably 98% by mass or more. A filler content within these ranges results in the covering layer having high air permeability and adhesiveness.

Acid Component

It is important that a coating liquid for forming a covering layer in the present invention contains an acid component. The acid component in a multilayer porous film according to the present invention may remain as an acid in the covering layer or may remain as a salt produced by a reaction with an alkali impurity in the covering layer.

It is important that the acid component has a first acid dissociation constant ($pK_{a1}$) of 5 or less and has no second acid dissociation constant ($pK_{a2}$) or a second acid dissociation constant ($pK_{a2}$) of 7 or more in a dilute aqueous solution at 25° C. An acid component having a first acid dissociation constant ($pK_{a1}$) of 5 or less in a dilute aqueous solution at 25° C. in such a small amount that no side reaction with a nonaqueous electrolyte occurs is effective in improving the dispersion of filler. An acid component having no second acid dissociation constant ($pK_{a2}$) or a second acid dissociation constant ($pK_{a2}$) of 7 or more in a dilute aqueous solution at 25° C. negligibly forms a chelate with an eluting polyvalent cation contained as an impurity in the filler and is effective in preventing aggregation of the filler. A more preferred acid component has a first acid dissociation constant ($pK_{a1}$) of 4.5 or less, for example, in the range of −10 to 4.5, and has no second acid dissociation constant ($pK_{a2}$) or a second acid dissociation constant ($pK_{a2}$) of 7.5 or more, for example, in the range of 7.5 to 15.

Examples of the acid component having such characteristics include lower primary carboxylic acids, such as formic acid, acetic acid, propionic acid, and acrylic acid; nitro acids, such as nitric acid and nitrous acid; halogen oxo acids, such as perchloric acid and hypochlorous acid; hydrohalogenic acids, such as hydrochloric acid, hydrofluoric acid, and hydrobromic acid; and phosphoric acid, salicylic acid, glycolic acid, lactic acid, ascorbic acid, and erythorbic acid. Among these, formic acid, acetic acid, nitric acid, hydrochloric acid, and phosphoric acid are preferred because small amounts of these acids can lower pH and because of their availability and high stability. These acid components may be used alone or in combination.

The acid component content of a coating liquid for forming a covering layer in the present invention is preferably 10 mass ppm or more and 10000 mass ppm or less. The acid component content of the coating liquid is more preferably 100 mass ppm or more and 9000 mass ppm or less, still more preferably 1000 mass ppm or more and 8000 mass ppm or less.

The acid component content is preferably 10 mass ppm or more because the coating liquid has high stability and coatability, and a satisfactory coating film can be formed. The acid component content is preferably 10000 mass ppm or less because this does not adversely affect the performance of the nonaqueous electrolyte secondary battery.

Method for Forming Covering Layer

A covering layer in a multilayer porous film according to the present invention is formed from a coating liquid containing the acid component. The formation method may be a transfer method or a coating method, such as a coating and drying method. Formation using a coating and drying method is preferred in terms of continuous productivity.

A solvent of a coating liquid for use in the formation of the covering layer using a coating method is preferably a solvent in which a filler and a resin binder can be appropriately, uniformly, and stably dissolved or dispersed. Examples of such a solvent include N-methylpyrrolidone, N,N-dimethylformamide, N,N-dimethylacetamide, water, dioxane, acetonitrile, lower alcohols, glycols, glycerin, and lactates. Among these, water is preferably used as a main component of the solvent in terms of cost and environmental load. In particular, water is preferably used as a solvent.

The filler and the resin binder may be dissolved or dispersed in a solvent using a mechanical agitation method, for example, using a ball mill, bead mill, planetary ball mill, vibration ball mill, sand mill, colloid mill, attritor, rolling mill, high-speed impeller dispersion, disperser, homogenizer, high-speed impact mill, ultrasonic dispersion, or impeller blade.

The acid component may be added while the filler and the resin binder are dissolved or dispersed in a solvent or after dissolution or dispersion.

When the filler and the resin binder are dissolved or dispersed in a solvent, a dispersing aid, a stabilizer, and/or a thickener may be added before and/or after the dissolution or dispersion in order to improve the stability and to optimize the viscosity of the resulting coating liquid.

The coating liquid may be applied to a surface of a porous polyolefin resin film using any process. The coating liquid may be applied after extrusion and before stretching, after a longitudinal stretching process, or after a transverse stretching process.

The coating method in the coating process may be any method that can achieve the desired layer thickness and coating area. Examples of such a coating method include a gravure coater method, small-diameter gravure coater method, reverse roll coater method, transfer roll coater method, kiss coater method, dip coater method, knife coater method, air doctor coater method, blade coater method, rod coater method, squeeze coater method, cast coater method, die coater method, screen printing method, and spray coating method. In light of its application, the coating liquid may be applied to one side or both sides of a porous polyolefin resin film. In other words, in a multilayer porous film according to the present invention, a covering layer may be formed on one side or both sides of a porous polyolefin resin film.

After the application of the coating liquid, the solvent may be removed using any method, provided that the method does not adversely affect the porous polyolefin resin film. The solvent may be removed using a method for drying the porous polyolefin resin film at a temperature less than or equal to the melting point thereof while the porous polyolefin resin film is fixed, a method for drying the porous polyolefin resin film at low temperature under vacuum, or a method for immersing the porous polyolefin resin film into a poor solvent of the resin binder, coagulating the resin binder, and simultaneously extracting the solvent.

<Shape and Physical Properties of Multilayer Porous Film>

A multilayer porous film according to the present invention preferably has a thickness in the range of 5 to 100 μm. A multilayer porous film according to the present invention more preferably has a thickness in the range of 8 to 50 μm, still more preferably 10 to 30 μm. Having a thickness of 5 μm or more, a multilayer porous film according to the present invention used as a nonaqueous electrolyte secondary battery separator can substantially have required electrical insulating properties. For example, even when a protrusion of an electrode is exposed to great force, the protrusion rarely pierces through the nonaqueous electrolyte secondary battery separator and causes a short circuit, and the nonaqueous electrolyte secondary battery separator has improved battery safety. A multilayer porous film having a thickness of 100 μm or less can have low electrical resistance and ensure the sufficient performance of the battery.

The covering layer preferably has a thickness of 0.5 μm or more, more preferably 1 μm or more, still more preferably 2 μm or more, particularly preferably 3 μm or more, in terms of heat resistance. The upper limit of the thickness of the covering layer is preferably 90 μm or less, more preferably 50 μm or less, still more preferably 30 μm or less, particularly preferably 10 μm or less, in terms of communicability.

A multilayer porous film according to the present invention preferably has a porosity of 30% or more, more preferably 35% or more, still more preferably 40% or more. A porosity of 30% or more results in a multilayer porous film having satisfactory communicability and excellent air-permeability characteristics.

The upper limit of the porosity of the multilayer porous film is preferably 70% or less, more preferably 65% or less, still more preferably 60% or less. A porosity of 70% or less is preferred because the multilayer porous film can have high strength and handleability.

A multilayer porous film according to the present invention preferably has an air resistance of 1000 s/100 mL or less, more preferably 10 to 800 s/100 mL, still more preferably 50 to 500 s/100 mL. An air resistance of 1000 s/100 mL or less is preferred because the multilayer porous film can have satisfactory communicability and high air permeability.

Air resistance is a measure of resistance to air passing through the film in the direction of the film thickness. More specifically, air resistance represents the number of seconds required for 100 mL of air to pass through the film. A lower air resistance therefore indicates lower resistance to air passing through the film, and a higher air resistance indicates higher resistance to air passing through the film. In other words, a lower air resistance indicates better communicability in the direction of the film thickness, and a higher air resistance indicates worse communicability in the direction of the film thickness. The term communicability refers to the degree of communication between pores in the direction of the film thickness. A multilayer porous film having low air resistance according to the present invention can be used in various applications. For example, in the case where a multilayer porous film is used as a nonaqueous electrolyte secondary battery separator, low air resistance means the ease of lithium ion transfer and is preferred because of high battery performance.

The air resistance of a multilayer porous film is measured using a method described below in the examples.

A multilayer porous film according to the present invention preferably has SD characteristics when used as a battery separator. More specifically, the air resistance after heating at 135° C. for 5 seconds is preferably 10000 s/100 mL or more, more preferably 25000 s/100 mL or more, still more preferably 50000 s/100 mL or more. When the air resistance after heating at 135° C. for 5 seconds is 10000 s/100 mL or more, pores can be rapidly closed upon abnormal heat generation, thereby interrupting electric current and avoiding troubles, such as breakage of the battery.

The shrinkage ratio of a multilayer porous film according to the present invention at 150° C. is preferably less than 10%, more preferably less than 9%, still more preferably less than 8%, in the longitudinal and transverse directions. A shrinkage ratio of less than 10% at 150° C. indicates high dimensional stability and heat resistance even in the case of abnormal heat generation exceeding the SD temperature. This can prevent breakage of the film and increase the internal short-circuit temperature. The lower limit of the shrinkage ratio is preferably, but not limited to, 0% or more.

The shrinkage ratio of a multilayer porous film is measured using a method described below in the examples.

The peel strength between a porous polyolefin resin film and a covering layer of a multilayer porous film according to the present invention is preferably 1 N/cm or more, more preferably 2 N/cm or more. A peel strength of 1 N/cm or more results in a significantly decreased probability that the filler will fall off.

The peel strength is measured using a method described below in the examples.

[Battery]

A nonaqueous electrolyte secondary battery that includes a multilayer porous film according to the present invention as a battery separator will be described below with reference to FIG. 1.

A positive electrode sheet 21 and a negative electrode sheet 22 are wound with a battery separator 10 interposed therebetween and are fastened with an adhesive tape, thus forming a wound body.

This winding process will be described in detail below. One end of a battery separator is inserted into a slit of a pin. The pin is slightly rotated to wind one end of the battery separator around the pin. The surface of the pin is in contact with a covering layer of the battery separator. A positive electrode and a negative electrode are placed on opposite sides of the battery separator. The pin is rotated with a winding machine to wind the positive and negative electrodes and the battery separator. After winding, the pin is removed from the wound body.

The wound body composed of the positive electrode sheet 21, the battery separator 10, and the negative electrode sheet 22 integrally wound is placed in a cylindrical closed-end battery case and is welded to positive and negative electrode leads 24 and 25. An electrolyte solution is then poured into a battery can. After the electrolyte solution sufficiently infiltrates the battery separator 10, the opening of the battery can is sealed with a positive electrode lid 27 with a gasket 26 interposed therebetween. A cylindrical nonaqueous electrolyte secondary battery 20 is completed by precharging and aging.

The electrolyte solution contains a lithium salt as an electrolyte dissolved in an organic solvent. Examples of the organic solvent include, but are not limited to, esters, such as propylene carbonate, ethylene carbonate, butylene carbonate, γ-butyrolactone, γ-valerolactone, dimethyl carbonate, methyl propionate, and butyl acetate, nitriles, such as acetonitrile, ethers, such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxolane, and sulfolane. These organic solvents may be used alone or in combination. In particular, a preferred electrolyte solution contains 1.0 mol/L lithium hexafluorophosphate ($LiPF_6$) dissolved in a solvent composed of a mixture of 1 part by mass of ethylene carbonate and 2 parts by mass of methyl ethyl carbonate.

The negative electrode is a single body composed of an alkali metal or a compound containing an alkali metal and a current collector material, such as a stainless steel mesh. The alkali metal may be lithium, sodium, or potassium. Examples of the compound containing an alkali metal include alloys of the alkali metal and aluminum, lead, indium, potassium, cadmium, tin, or magnesium, compounds of the alkali metal and a carbon material, and compounds of a low-potential alkali metal and a metal oxide or sulfide. The carbon material for use in the negative electrode may be any carbon material that can be doped and undoped, for example, graphite, pyrolytic carbon, coke, glassy carbon, a fired product of an organic high-molecular compound, mesocarbon microbeads, carbon fibers, or activated carbon.

In the present embodiment, the negative electrode is a belt-shaped negative electrode sheet manufactured by dissolving poly(vinylidene fluoride) in N-methylpyrrolidone to produce a solution, mixing the solution with a carbon material having an average particle size of 10 μm to produce a slurry, making the negative electrode mixture slurry to pass through a 70-mesh screen to remove large particles, uniformly applying the negative electrode mixture slurry to both sides of a negative collector formed of a belt-shaped copper foil having a thickness of 18 μm, drying the negative electrode mixture slurry, compression-molding the negative collector with a rolling mill, and cutting the negative collector.

In the positive electrode, a metal oxide, such as lithium cobalt oxide, lithium nickel oxide, lithium manganese oxide, manganese dioxide, vanadium pentoxide, or chromium oxide, or a metal sulfide, such as molybdenum disulfide, is used as an active material. A conductive aid and a binder, such as polytetrafluoroethylene, are appropriately added to the positive-electrode active material to produce a mixture. The mixture is formed into a shaped product using a current collector material, such as a stainless steel mesh, as a core material.

In the present embodiment, the positive electrode is a belt-shaped positive electrode sheet manufactured as described below. Lithium cobalt oxide ($LiCoO_2$) is mixed with flake graphite, which serves as a conductive aid, at a (lithium cobalt oxide:flake graphite) mass ratio of 90:5. This mixture is mixed with a solution of poly(vinylidene fluoride) dissolved in N-methylpyrrolidone to produce a slurry. This positive electrode mixture slurry is allowed to pass through a 70-mesh screen to remove large particles, is then uniformly applied to both sides of a positive collector formed of an aluminum foil having a thickness of 20 μm, is dried, and is compression-molded with a rolling mill. The positive collector is then cut into a belt-shaped positive electrode sheet.

EXAMPLES

A multilayer porous film according to the present invention will be described in detail in the following examples and comparative examples. The present invention is not limited to these examples. The lengthwise direction of a multilayer porous film is referred to as "longitudinal", and the direction perpendicular to the lengthwise direction is referred to as "transverse".

(1) Filler Content

The filler content of a covering layer is the percentage of the filler with respect to the total amount of the filler and a resin binder in a coating liquid.

(2) Solid Content

The solid content is the ratio of the total amount of filler and resin binder to 100% by mass coating liquid.

(3) Average Circularity of Filler

The average circularity of filler was calculated as the average of the ratios L'/L in the longitudinal and transverse directions, wherein L denotes the actual perimeter of a two-dimensional projection image of the filler in the longitudinal or transverse direction, and L' denotes the perimeter of a perfect circle having the same area as the projection image. L and L' were measured with an image analyzing apparatus.

(4) Stability of Coating Liquid

The stability of a coating liquid was determined by leaving the coating liquid still for 15 minutes after its preparation, observing its appearance, and rating the appearance according to the following criteria.

Circle: A filler sedimentation layer and a supernatant layer cannot be visually discriminated.

Cross: A filler sedimentation layer and a supernatant layer can be visually discriminated.

(5) Coatability

The coatability of a coating liquid was evaluated according to the following criteria.

Circle: Coatable. Visual observation shows the formation of a satisfactory coating film without aggregation of β articles.

Cross: Coating is difficult because of many aggregated particles.

(6) Total Thickness

The total thickness of a multilayer porous film was determined by measuring five unspecific in-plane points of the multilayer porous film with a ¹⁄₁₀₀₀-mm dial gauge and averaging the measurements.

(7) Thickness of Covering Layer

The thickness of a covering layer was determined as a difference between the total thickness of a multilayer porous film after the formation of the covering layer and the thickness of a porous polyolefin resin film.

(8) Air Resistance (Gurley Permeability)

Air resistance was measured in accordance with JIS P 8117.

(9) Anti-Curling Property

The anti-curling property was evaluated by cutting out an A4-size film from a multilayer porous film, sufficiently removing electricity by grounding, placing the film on a SUS flat plate, summing the height of each vertex from the SUS plate to calculate the accumulated curling height, and rating the accumulated curling height according to the following criteria.

Circle: Excellent anti-curling property with an accumulated curling height of less than 15 mm.

Cross: Poor anti-curling property with an accumulated curling height of 15 mm or more.

(10) Peel Strength

Figure 3:
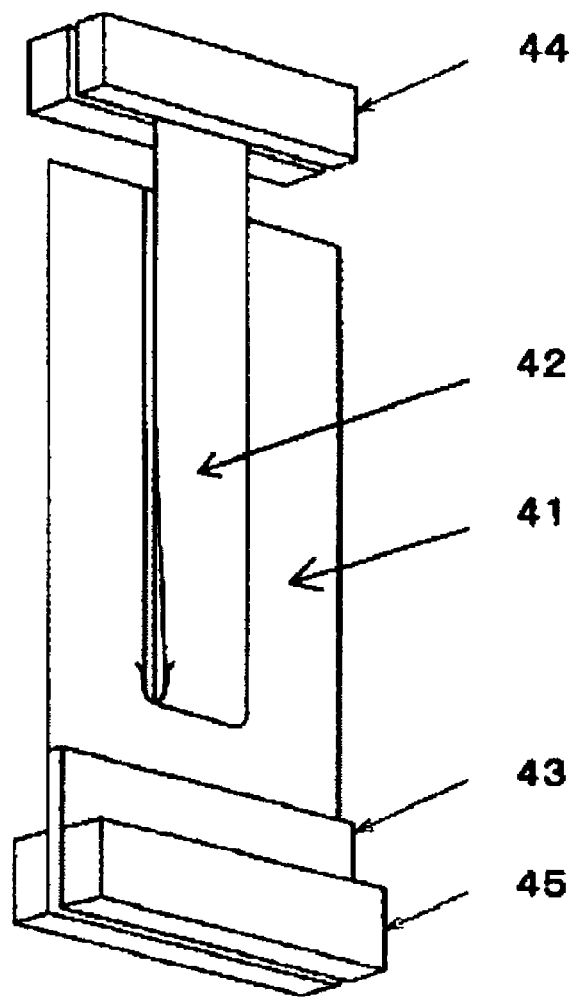
FIG. 3 is an explanatory view of a method for measuring peel strength.

The peel strength between a porous polyolefin resin film and a covering layer was measured using a method illustrated in FIG. 3 in accordance with JIS Z 0237. First, a sample 41 having a width of 50 mm and a length of 150 mm was cut out from a multilayer porous film. A tape 42 was longitudinally attached to the sample 41. The tape 42 was a cellophane adhesive tape (15 mm in width, manufactured by Nichiban Co., Ltd., JIS Z 1522). The sample 41 was bent 180 degrees such that opposite back sides of the tape were superposed with each other. 25 mm of the tape was peeled off the sample 41. One end of a portion of the sample 41 from which the tape 42 was peeled was fixed to a lower chuck 45 of a tensile tester (manufactured by Intesco Co., Ltd., Intesco IM-20ST) with a slip stopper 43 interposed therebetween. The tape was fixed to an upper chuck 44. The peel strength was measured at a test speed of 300 ram/min. After the measurement, the peel strength was determined by averaging 50-mm peel strength measurements on the test specimen except the initial 25-mm peel strength measurements and converting the averaged strength into strength per cm (10 mm) of width.

(11) Adhesiveness

Adhesiveness was evaluated from the peel strength measurements according to the following criteria.

Circle: The peel strength is 1 N/cm or more.

Cross: The peel strength is less than 1 N/cm.

(12) Shrinkage Ratio at 150° C.

A 150 mm×10 mm sample was cut out from a multilayer porous film, was marked such that the chuck-to-chuck distance was 100 mm, and was left standing in an oven (manufactured by Tabai Espec Corporation, Tabai Gear oven GPH200) at 150° C. for 1 hour. The sample was then taken out from the oven and was cooled. The length (mm) of the sample was measured. The shrinkage ratio was calculated using the following equation.

$$\text{Shrinkage ratio (\%)} = \{(100 - \text{length after heating})/100\} \times 100$$

This measurement was performed in the longitudinal and transverse directions of the multilayer porous film.

(13) Heat Resistance

Heat resistance was evaluated from the shrinkage ratio measurements according to the following criteria.

Circle: The shrinkage ratio for 150° C. for 1 hour is less than 10% in the longitudinal and transverse directions.

Cross: The shrinkage ratio for 150° C. for 1 hour is 10% or more in the longitudinal or transverse direction.

(14) Differential Scanning Calorimetry (DSC)

A 10-mg sample of a multilayer porous film was heated from 25° C. to 240° C. at a heating rate of 10° C./min in a nitrogen atmosphere in a differential scanning calorimeter (DSC-7) manufactured by PerkinElmer, Inc. and was held for 1 minute. The sample was then cooled from 240° C. to 25° C. at a cooling rate of 10° C./min and was held for 1 minute. The sample was then reheated from 25° C. to 240° C. at a heating rate of 10° C./min. During the reheating, the presence or absence of β crystal activity was judged by detection of a peak at a temperature in the range of 145° C. to 160° C., which corresponds to the crystal melting peak temperature (Tmβ) of β crystals of a polypropylene resin, according to the following criteria.

Circle: Tmβ is detected at a temperature in the range of 145° C. to 160° C. (β crystal activity).

Cross: No Tmβ is detected at a temperature in the range of 145° C. to 160° C. (no β crystal activity).

(15) Wide-Angle X-Ray Diffraction Measurement (XRD)

Figure 2:
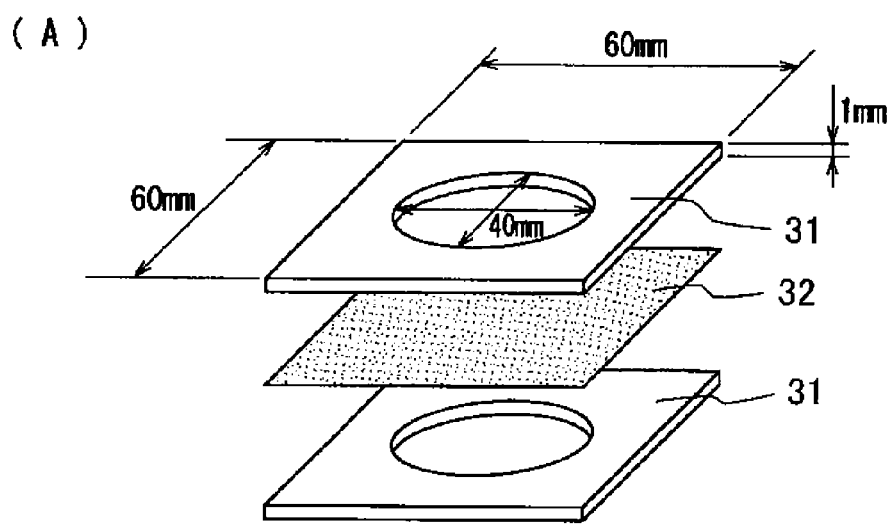
FIG. 2 is an explanatory view of a method for fixing a multilayer porous film in wide-angle X-ray diffraction measurement.
Figure 2:
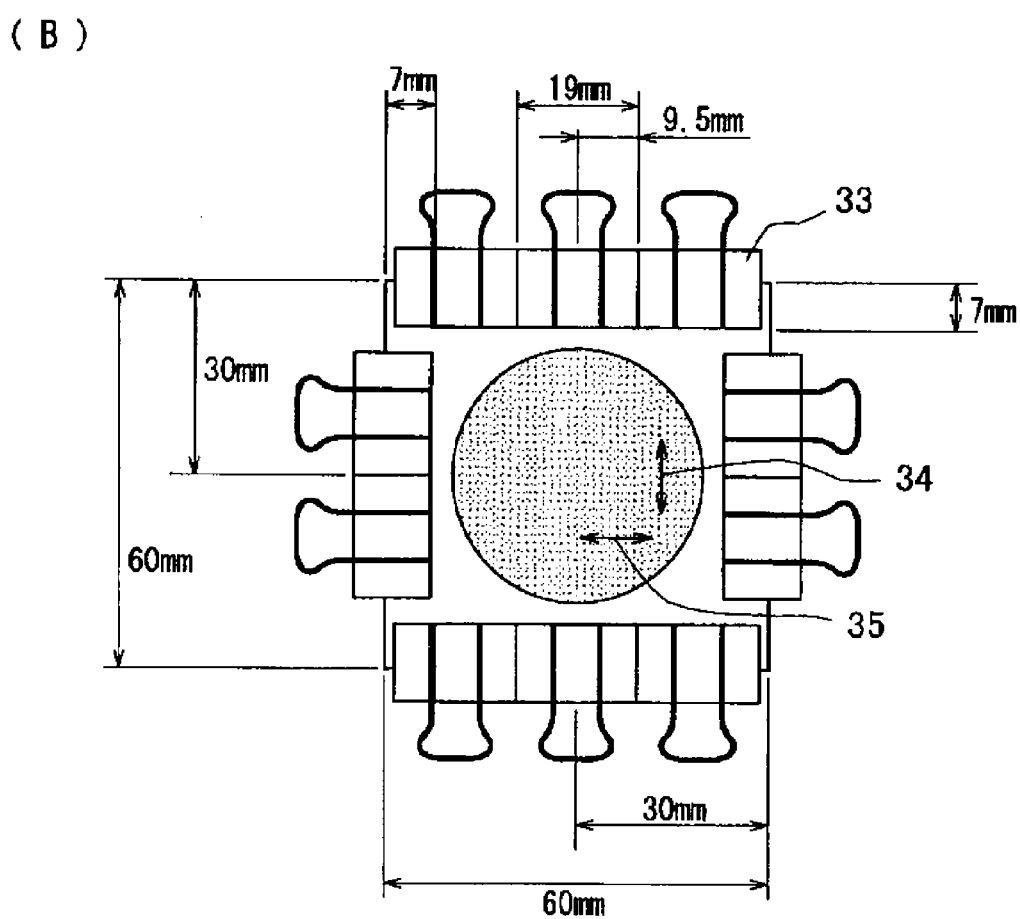

As illustrated in FIG. 2(A), a 60 mm×60 mm sample 32 of a multilayer porous film was placed between two aluminum sheets (material: JIS A 5052, size: 60 mm in length, 60 mm in width, 1 mm in thickness) 31 and 31 having a 40 mmϕ circular opening in the center thereof. The periphery of the sample 32 was fixed with clips 33 as illustrated in FIG. 2(B).

While the sample 32 of the multilayer porous film was fixed between the two aluminum sheets 31 and 31, the sample 32 was placed in a forced convection constant temperature oven (manufactured by Yamato Scientific Co., Ltd., model: DKN602) at a set temperature of 180° C. and at an indicated temperature of 180° C. for 3 minutes. The set temperature was then changed to 100° C. The sample 32 was slowly cooled to 100° C. over 10 minutes or more. The sample 32 was taken out at the point in time when the indicated temperature reached 100° C. The sample 32 of the multilayer porous film fixed between the two aluminum sheets 31 and 31 was cooled at 25° C. for 5 minutes. The central 40 mmϕ circular portion was subjected to wide-angle X-ray diffraction measurement under the following measurement conditions. In FIG. 2(B), 34 denotes the longitudinal direction of the film, and 35 denotes the transverse direction of the film.

Wide-angle X-ray diffractometer: manufactured by Mac Science Co., Ltd., model number: XMP18A
  X-ray source: CuKα ray, output: 40 kV, 200 mA
  Scanning method: 2θ/θ scan
  2θ range: 5 to 25 degrees
  Scan interval: 0.05 degrees
  Scanning speed: 5 degrees/min The presence or absence of β crystal activity was judged from a peak assigned to the (300) face of β crystals of a polypropylene resin in the resulting diffraction profile as described below.

Circle: The peak was detected at a 2θ in the range of 16.0 to 16.5 degrees (β crystal activity).

Cross: The peak was not detected at a 2θ in the range of 16.0 to 16.5 degrees (no β crystal activity).

When a 60 mm×60 mm sample could not be cut out from the multilayer porous film, a sample may be adjusted so as to be placed in the 40 mmϕ circular opening at the center of the aluminum sheets.

[Preparation of Porous Polyolefin Resin Film]

A polypropylene resin (manufactured by Prime Polymer Co., Ltd., Prime Polypro F300SV, density: 0.90 g/cm$^3$, MFR: 3.0 g/10 min) and a β crystal nucleating agent 3,9-bis[4-(N-cyclohexylcarbamoyl)phenyl]-2,4,8,10-tetraoxaspiro[5.5]undecane were prepared. The raw materials were blended at a ratio of 0.2 parts by mass of the β crystal nucleating agent to 100 parts by mass of the polypropylene resin. The raw materials were fed into a co-rotating twin-screw extruder (diameter: 40 mmϕ, L/D: 32) manufactured by Toshiba Machine Co., Ltd. and were melt-blended at a set temperature of 300° C. The strand was cooled and solidified in a water tank and was cut with a pelletizer into pellets of the polypropylene resin composition.

The pellets were extruded through a T-die extruder nozzle and were cooled and solidified with a casting roll at 124° C. to produce a film-like substance. The percentage of β crystals of the film-like substance was measured using the DSC method described above. The percentage of β crystals was 80%.

The film-like substance was longitudinally stretched 4.6 times with a longitudinal stretching machine at 100° C., was then transversely stretched 2.1 times with a transverse stretching machine at 150° C., and was then subjected to heat setting at 153° C.

The stretched film was then subjected to corona surface treatment with Generator CP1 manufactured by Vetaphone at an output of 0.4 kW and at a rate of 10 m/min, thus forming a porous polyolefin resin film.

Example 1

39.4 parts by mass of alumina (manufactured by Nippon Light Metal Co., Ltd., LS-235C, average particle size: 0.5 µm, average circularity: 0.48), 0.6 parts by mass of poly (vinyl alcohol) (manufactured by Kuraray Co., Ltd., PVA 124, degree of saponification: 98.0 to 99.0, average degree of polymerization: 2400), and 60.0 parts by mass of water were mixed and were treated in a homogenizer at a peripheral speed of 9 m/s for 10 minutes, yielding a coating liquid having a solid content of 40%. An acid component hydrochloric acid ($pK_{a1}$=-8.0, no $pK_{a2}$) was added to the coating liquid such that the hydrochloric acid content of the coating liquid was 7000 mass ppm.

The coating liquid was diluted to a solid content of 33% with water, was applied to the porous polyolefin resin film with a gravure roll (lattice type, number of lines: 25 L/inch, depth 290 cell volume 145 mL/m$^2$), and was dried in a drying furnace at 45° C.

The physical properties of the multilayer porous film were evaluated and summarized in Table 1 together with the evaluation results for the stability and coatability of the coating liquid.

Example 2

39.4 parts by mass of alumina (manufactured by Nippon Light Metal Co., Ltd., LS-410, average particle size: 0.5 average circularity: 0.52), 0.6 parts by mass of poly(vinyl alcohol) (manufactured by Kuraray Co., Ltd., PVA 124, degree of saponification: 98.0 to 99.0, average degree of polymerization: 2400), and 60.0 parts by mass of water were mixed and were treated in a homogenizer at a peripheral speed of 9 m/s for 10 minutes, yielding a coating liquid having a solid content of 40%. An acid component hydrochloric acid ($pK_{a1}$=-8.0, no $pK_{a2}$) was added to the coating liquid. The hydrochloric acid content of the coating liquid was 35 mass ppm.

The coating liquid was diluted to a solid content of 33% with water. The coating liquid was applied to the porous polyolefin resin film and was dried in the same manner as in Example 1, thereby forming a multilayer porous film. Table 1 summarized the evaluation results.

Example 3

39.4 parts by mass of alumina (manufactured by Nippon Light Metal Co., Ltd., LS-235C, average particle size: 0.5 µm, average circularity: 0.48), 0.6 parts by mass of poly (vinyl alcohol) (manufactured by Kuraray Co., Ltd., PVA 124, degree of saponification: 98.0 to 99.0, average degree of polymerization: 2400), and 60.0 parts by mass of water were mixed and were treated in a homogenizer at a peripheral speed of 9 m/s for 10 minutes, yielding a coating liquid having a solid content of 40%. An acid component ascorbic acid ($pK_{a1}$=4.2, $pK_{a2}$=11.6) was added to the coating liquid such that the ascorbic acid content of the coating liquid was 2500 mass ppm.

The coating liquid was applied to the porous polyolefin resin film with a #10 bar coater and was dried at 60° C. for 2 minutes, thereby forming a multilayer porous film. Table 1 summarized the evaluation results.

Comparative Example 1

39.4 parts by mass of alumina (manufactured by Sumika Alchem Co., Ltd., AA-03, average particle size: 0.3 µm, average circularity: 0.75), 0.6 parts by mass of poly(vinyl alcohol) (manufactured by Kuraray Co., Ltd., PVA 124, degree of saponification: 98.0 to 99.0, average degree of polymerization: 2400), and 60.0 parts by mass of water were mixed and were treated in a homogenizer at a peripheral speed of 9 m/s for 10 minutes, yielding a coating liquid having a solid content of 40%. An acid component hydrochloric acid ($pK_{a1}$=−8.0, no $pK_{a2}$) was added to the coating liquid such that the hydrochloric acid content of the coating liquid was 35 mass ppm.

The coating liquid was diluted to a solid content of 33% with water. The coating liquid was applied to the porous polyolefin resin film and was dried in the same manner as in Example 1, thereby forming a multilayer porous film. Table 1 summarized the evaluation results.

Comparative Example 2

39.4 parts by mass of alumina (manufactured by Nippon Light Metal Co., Ltd., LS-235C, average particle size: 0.5 μm, average circularity: 0.48) and 0.6 parts by mass of poly(vinyl alcohol) (manufactured by Kuraray Co., Ltd., PVA 124, degree of saponification: 98.0 to 99.0, average degree of polymerization: 2400) were dispersed in 60.0 parts by mass of water. The solid content of the coating liquid was 40%. An acid component oxalic acid ($pK_{a1}$=1.3, $pK_{a2}$=4.3) was added to the coating liquid such that the oxalic acid content was 7000 mass ppm.

The coating liquid was applied to the porous polyolefin resin film and was dried in the same manner as in Example 2, thereby forming a multilayer porous film. Table 1 summarized the evaluation results.

Comparative Example 3

39.4 parts by mass of alumina (manufactured by Nippon Light Metal Co., Ltd., LS-410, average particle size: 0.5 μm, average circularity: 0.52), 0.6 parts by mass of poly(vinyl alcohol) (manufactured by Kuraray Co., Ltd., PVA 124, degree of saponification: 98.0 to 99.0, average degree of polymerization: 2400), and 60.0 parts by mass of water were mixed and were treated in a homogenizer at a peripheral speed of 9 m/s for 10 minutes, yielding a coating liquid having a solid content of 40%. No acid component was added.

The coating liquid was diluted to a solid content of 33% with water. The coating liquid was applied to the porous polyolefin resin film and was dried in the same manner as in Example 1, thereby forming a multilayer porous film. Table 1 summarized the evaluation results.

Comparative Example 4

The physical properties of the porous polyolefin resin film were evaluated and summarized in Table 1.

As is clear from Table 1, the coating liquids according to the working examples Examples 1 to 3 had high stability and coatability. In the multilayer porous films according to Examples 1 to 3 formed from the coating liquids, the covering layer had high air permeability, heat resistance, and adhesiveness. The multilayer porous films had excellent handleability without curling.

In contrast, the multilayer porous film according to Comparative Example 1, in which the filler had a higher average circularity and was more densely packed than Example 1, could not relieve strain resulting from drying shrinkage and therefore caused curling.

The multilayer porous film according to Comparative Example 2 contained many polyvalent anions because of the low second acid dissociation constant ($pK_{a2}$) of the acid component added to the coating liquid. The polyvalent anions formed chelates with polyvalent cations, such as aluminum, calcium, and magnesium cations, in the filler. These chelates acted as coagulants and significantly decreased the stability and coatability of the coating liquid. As a result, the multilayer porous film had insufficient heat resistance.

In the multilayer porous film according to Comparative Example 3, since the coating liquid contained no acid component, the filler was not deflocculated, and aggregates were found on the film.

The porous polyolefin resin film according to Comparative Example 4 had insufficient heat resistance because of no covering layer.

INDUSTRIAL APPLICABILITY

A multilayer porous film according to the present invention can be used in various applications that require air-permeability characteristics and heat resistance. A multilayer porous film according to the present invention can be very suitably used as a material for lithium-ion secondary battery separators; disposable diapers, body fluid absorbent pads, such as sanitary products, and sanitary supplies, such as bed sheets; medical supplies, such as surgical gowns and hot compress base materials; clothing materials, such as jackets, sportswear, and rainwear; building materials, such as wallpapers, roof waterproofing materials, heat-insulating materials, and sound-absorbing materials; drying agents; desiccants; deoxidizers; disposable body warmers; and packaging materials for freshness-keeping packaging and food packaging.

TABLE 1

|  |  |  | Example 1 | Example 2 | Example 3 | Comparative example 1 | Comparative example 2 | Comparative example 3 | Comparative example 4 |
|---|---|---|---|---|---|---|---|---|---|
| Average circularity of filler |  | — | 0.48 | 0.52 | 0.48 | 0.75 | 0.48 | 0.52 | — |
| Acid component | Type | — | Hydrochloric acid | Hydrochloric acid | Ascorbic acid | Hydrochloric acid | Oxalic acid | None | — |
|  | pKa1 | — | −8.0 | −8.0 | 4.2 | −8.0 | 1.3 | — | — |
|  | pKa2 | — | None | None | 11.6 | None | 4.3 | — | — |
| Coating liquid | Stability | — | ○ | ○ | ○ | ○ | x | ○ | — |
|  | Coatability | — | ○ | ○ | ○ | ○ | x | x | — |
| Total thickness of laminated porous film |  | μm | 27 | 25 | 25 | 25 | 29 | 26 | 20 |
| Thickness of covering layer |  | μm | 7 | 5 | 5 | 5 | 9 | 6 | 0 |
| Air resistance |  | s/100 mL | 184 | 179 | 196 | 213 | 188 | 185 | 157 |
| Anti-curling property |  | — | ○ | ○ | ○ | x | ○ | ○ | ○ |
| Peel strength |  | N/cm | 2.1 | 2 | 2.1 | 2.4 | 2.2 | 1.7 | — |
| Adhesiveness |  | — | ○ | ○ | ○ | ○ | ○ | ○ | — |
| Thermal shrinkage ratio at 150° C. | Longitudinal | % | 4 | 4 | 5 | 4 | 7 | 4 | 8 |
|  | Transverse | % | 1 | 5 | 4 | 1 | 12 | 1 | 10 |
| Heat resistance |  | — | ○ | ○ | ○ | ○ | x | ○ | x |

Although the present invention has been described in detail with reference to particular embodiments, it is apparent to a person skilled in the art that various modifications can be made therein without departing from the spirit and scope of the present invention.

The present application is based on Japanese Patent Application (Japanese Patent Application No. 2012-146603) filed on Jun. 29, 2012, which is incorporated herein by reference in its entirety.

The invention claimed is:

1. A multilayer porous film, comprising:
a porous polyolefin resin film; and
a covering layer present on at least one surface of said porous polyolefin resin film,
wherein the covering layer is a dried coating liquid that comprises i) a filler; ii) an acid component; and iii) a resin binder,
wherein the filler has an average circularity of 0.3 or more and less than 0.7,
wherein the acid component has a first acid dissociation constant ($pK_{a1}$) of 5 or less and has no second acid dissociation constant ($pK_{a2}$) or a second acid dissociation constant ($pK_{a2}$) of 7 or more in an aqueous solution, said acid dissociation constant measured at an aqueous solution temperature of 25° C., and
wherein the acid component remain as an acid or a salt in the covering layer.

2. The multilayer porous film according to claim 1, wherein the acid component content of the coating liquid is 10 mass ppm or more and 10000 mass ppm or less.

3. The multilayer porous film according to claim 1, wherein the filler is made of a metal oxide.

4. The multilayer porous film according to claim 1, wherein the filler has a specific surface area of 5 $m^2$/g or more and less than 15 $m^2$/g.

5. The multilayer porous film according to claim 1, wherein the filler content of the covering layer is 80% by mass or more and 99.9% by mass or less of the total amount of the filler and the resin binder.

6. The multilayer porous film according to claim 1, wherein the porous polyolefin resin film contains polypropylene.

7. The multilayer porous film according to claim 1, wherein the porous polyolefin resin film has β crystal activity.

8. The multilayer porous film according to claim 1, wherein the covering layer is formed on the porous polyolefin resin film using a coating and drying method.

9. The multilayer porous film according to claim 1, wherein the coating liquid contains a solvent mainly composed of water.

10. A separator of a nonaqueous electrolyte secondary battery, comprising the multilayer porous film according to claim 1.

11. A nonaqueous electrolyte secondary battery, comprising the separator for a nonaqueous electrolyte secondary battery according to claim 10.

12. The multilayer porous film according to claim 1, wherein the acid component comprises a lower primary carboxylic acid, a nitro acid, a halogen oxo acid, a hydrohalogenic acid, a phosphoric acid, and a combination thereof.

13. The multilayer porous film according to claim 1, wherein the acid component comprises at least one acid selected from the group consisting of formic acid, acetic acid, propionic acid, acrylic acid, nitric acid, nitrous acid, perchloric acid, hypochlorous acid, hydrochloric acid, hydrofluoric acid, hydrobromic acid, phosphoric acid, salicylic acid, glycolic acid, lactic acid, ascorbic acid, and erythorbic acid.

14. The multilayer porous film according to claim 1, wherein the resin binder comprises at least one resin binder selected from the group consisting of a polyether, a polyamide, a polyimide, a polyamideimide, a polyaramide, an ethylene-vinyl acetate copolymers where the structural unit derived from vinyl acetate constitutes 0% to 20% by mole, an ethylene-acrylic acid copolymer, a poly(vinylidene fluoride), a poly(vinylidene fluoride)-hexafluoropropylene, a poly(vinylidene fluoride)-trichloroethylene, polytetrafluoroethylene, a fluorinated rubber, a styrene-butadiene rubber, a nitrile butadiene rubber, a polybutadiene rubber, polyacrylonitrile, poly(acrylic acid), a derivative of poly(acrylic acid), poly(methacrylic acid), a derivative of poly(methacrylic acid), carboxymethylcellulose, hydroxyethylcellulose, cyanoethylcellulose, poly(vinyl alcohol), cyanoethyl poly(vinyl alcohol), poly(vinyl butyral), polyvinylpyrrolidone, poly-N-vinylacetamide, a cross-linked acrylic resin, a polyurethane, an epoxy resin, and a maleic-acid-modified polyolefin.

15. The multilayer porous film according to claim 1, wherein the resin binder comprises at least one resin binder selected from the group consisting of polyoxyethylene, poly(vinyl alcohol), poly(vinylidene fluoride), polyvinylpyrrolidone, polyacrylonitrile, a styrene-butadiene rubber, carboxymethylcellulose, a derivative of poly(acrylic acid), and a maleic-acid-modified polyolefin.

* * * * *